(12) United States Patent
Tsai

(10) Patent No.: US 12,472,704 B2
(45) Date of Patent: Nov. 18, 2025

(54) HOT-PRESSING MOLDING METHOD FOR FIBER THERMOSETTING PREPREG MATERIAL

(71) Applicant: Chang-Hung Tsai, Kaohsiung (TW)

(72) Inventor: Chang-Hung Tsai, Kaohsiung (TW)

( * ) Notice: Subject to any disclaimer, the term of this patent is extended or adjusted under 35 U.S.C. 154(b) by 659 days.

(21) Appl. No.: 17/942,215

(22) Filed: Sep. 12, 2022

(65) Prior Publication Data

US 2024/0083120 A1    Mar. 14, 2024

(51) Int. Cl.
*B29C 70/34* (2006.01)
*B29C 33/04* (2006.01)
*B29C 33/44* (2006.01)
*B29C 70/18* (2006.01)
*B29K 101/10* (2006.01)
*B29K 105/08* (2006.01)
*B29K 307/04* (2006.01)

(52) U.S. Cl.
CPC .......... *B29C 70/342* (2013.01); *B29C 33/046* (2013.01); *B29C 33/44* (2013.01); *B29C 70/18* (2013.01); *B29K 2101/10* (2013.01); *B29K 2105/0881* (2013.01); *B29K 2307/04* (2013.01)

(58) Field of Classification Search
CPC ..... B29C 70/342; B29C 70/18; B29C 33/046; B29C 33/44; B29K 2101/10; B29K 2105/0881; B29K 2307/04

USPC ......................................................... 264/313
See application file for complete search history.

(56) References Cited

U.S. PATENT DOCUMENTS

| 10,999,052 | B1 * | 5/2021 | Margraf, Jr. ............. B29C 41/40 |
| 2018/0162020 | A1 * | 6/2018 | Cho ....................... B29C 43/361 |

FOREIGN PATENT DOCUMENTS

| EP | 0646447 A1 * | 4/1995 | ........... F02M 35/112 |
| EP | 3109024 B1 * | 11/2017 | ............ B29C 70/44 |
| EP | 3659774 A1 * | 6/2020 | ............ B29C 43/10 |
| TW | I598216 B | 9/2017 | |

* cited by examiner

*Primary Examiner* — Christina A Johnson
*Assistant Examiner* — Xue H Liu
(74) *Attorney, Agent, or Firm* — LANWAY IPR SERVICES; Chun-Ming Shih

(57) ABSTRACT

A hot-pressing molding method for fiber thermosetting prepreg material includes providing a die module including a first side die and a second side die; providing an upper die; attaching fiber prepreg material to the upper die with the fiber prepreg material facing the die module; closing the upper die and the die module; heating and pressurizing the upper die and the die module; introducing and pouring a gas with a predetermined pressure through a preset passage into the upper die to soften the upper die so that the softened upper die transmits the predetermined pressure of the gas to the fiber prepreg material. Thus, the upper die applies a lateral pressure to the side wall of the molded product.

18 Claims, 2 Drawing Sheets

HOT-PRESSING MOLDING METHOD FOR FIBER THERMOSETTING PREPREG MATERIAL

BACKGROUND OF THE INVENTION

1. Field of the Invention

The present invention relates to a molding method and, more particularly, to a hot-pressing molding method (or thermoforming method) for fiber thermosetting prepreg (or preimpregnated) material.

2. Description of the Related Art

A conventional molding method for fiber material comprises the following steps: (1) providing a sheet fiber material that is stacked layer by layer to have a predetermined thickness, this step is called lamination; (2) placing the sheet fiber material into a mold which includes an upper metal die and a lower metal die, placing the mold so that the mold is pressed and heated during a period of time, for example, 3 to 30 minutes according to the molding conditions until the resin contained in the sheet fiber material is hardened; (3) forming a molded product after the resin is hardened, and removing the molded product from the mold. The upper metal die has a first shape and the lower metal die has a second shape complementary to the first shape feature.

However, the conventional molding method for fiber material has the following disadvantages. When the upper metal die and the lower metal die of the mold are closed, the mold only provides an upward pressure and a downward pressure, but cannot provide a lateral pressure, so that the side wall of the molded product does not have an enough strength. Thus, the height of the side wall of the molded product cannot exceed 5 mm to prevent the side wall of the molded product from being broken. In addition, when the molded product has an undercut, the upper metal die and the lower metal die of the mold easily interfere with the molded product when the mold is closed and opened.

Another conventional molding method for hot pressing fiber material was disclosed in the Taiwanese Patent Publication No. 1598216.

BRIEF SUMMARY OF THE INVENTION

In accordance with the present invention, there is provided a hot-pressing molding method for fiber thermosetting prepreg material, comprising providing a die module including a first side die and a second side die; providing an upper die; attaching fiber prepreg material to the upper die with the fiber prepreg material facing the die module; closing the upper die and the die module; heating and pressurizing the upper die and the die module; introducing and pouring a gas with a predetermined pressure through a preset passage into the upper die to soften the upper die so that the softened upper die transmits the predetermined pressure of the gas to the fiber prepreg material. The first side die and the second side die construct an outer face of the molded product. The first side die and the second side die are made of metallic material. The upper die constructs an inner face of the molded product. The upper die is made of plastic material. The upper die has a hollow structure that is formed by blow molding.

Preferably, a temperature for heating the upper die and the die module ranges between 110° C.-180° C.

Preferably, the plastic material of the upper die includes PP, PET, HDPE or PVC.

Preferably, the upper die is a plastic hollow die with a thin shell shape.

Preferably, the upper die has a thickness ranging between 0.2 mm-5 mm.

Preferably, the die module has an undercut.

Preferably, the fiber prepreg material is attached to the upper die by adhering.

Preferably, the fiber prepreg material is a sheet shaped fiber selected from carbon fiber or reinforced fiber, and the fiber prepreg material is stacked layer by layer to reach a predetermined thickness.

Preferably, the fiber prepreg material is disposed at a unidirection state or a woven state.

According to the primary advantage of the present invention, the hot-pressing molding method of the present invention introduces a pressure that is transmitted evenly to the fiber prepreg material to apply a pressure on the lateral direction of the molded product so that the molded product has a better side wall structure.

According to another advantage of the present invention, the upper die is flexible so that the molded product is formed with an undercut easily without being interfered by the die module.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
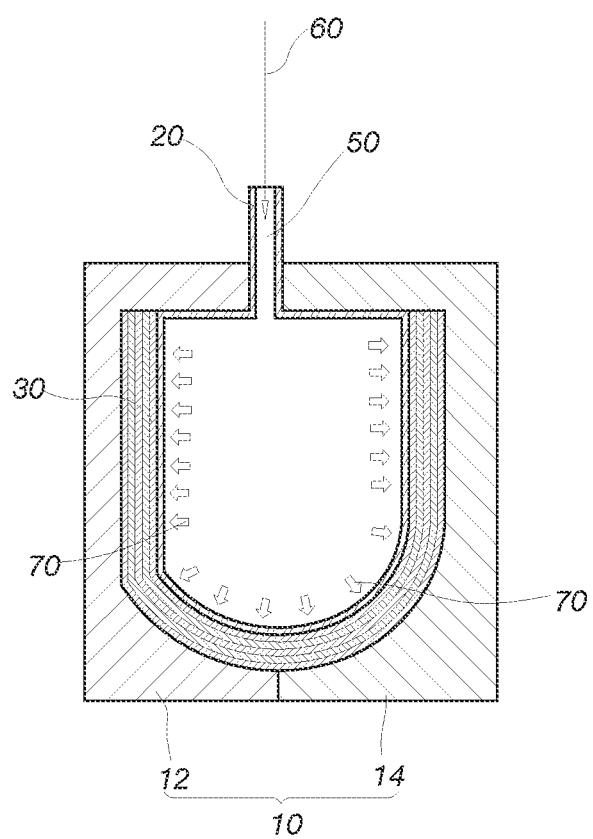
FIG. 1 is a cross-sectional view of a molded product in accordance with the first preferred embodiment of the present invention, wherein the die module has a left die and a right die.

Referring to the drawings and initially to FIG. 1, a hot-pressing molding method for fiber thermosetting prepreg material in accordance with the preferred embodiment of the present invention comprises:

providing a die module 10 including a first (or left) side die 12 and a second (or right) side die 14;

providing an upper die 20;

attaching fiber prepreg (PPG) material 30 to the upper die 20 with the fiber prepreg material 30 facing the die module 10;

closing the upper die 20 and the die module 10 with the fiber prepreg material 30 sandwiched between the upper die 20 and the die module 10;

heating and pressurizing the upper die 20 and the die module 10;

introducing and pouring a gas 60 with a predetermined pressure 70 through a preset passage 50 into the upper die 20 to soften the upper die 20 so that the softened upper die 20 transmits the predetermined pressure 70 of the gas 60 to the fiber prepreg material 30;

forming a molded product of the fiber prepreg material 30.

The first side die 12 and the second side die 14 construct an outer face of the molded product. The first side die 12 and the second side die 14 are made of metallic material. Preferably, the outer face of the molded product has a three-dimensional perspective shape surrounding 360 degrees, such as a golf ball head or a full-face helmet.

The upper die 20 constructs an inner face of the molded product and functions as a pressure source. The upper die 20 is made of plastic material, such as a plastic sheet plate. The upper die 20 has a thin-shell hollow structure that is formed by blow molding. Alternatively, the upper die 20 is formed by injection molding.

The fiber prepreg material 30 contains resin. The fiber prepreg material 30 is a thermosetting prepreg containing an epoxy resin or PU resin.

In the preferred embodiment of the present invention, a temperature for heating the upper die 20 and the die module 10 ranges between 110 to 180 degrees Celsius (110° C.-180° C.).

In the preferred embodiment of the present invention, the plastic material of the upper die 20 includes PP, PET, HDPE or PVC.

In the preferred embodiment of the present invention, the upper die 20 is a plastic hollow die with a thin shell shape.

In the preferred embodiment of the present invention, the upper die 20 has a thickness ranging between 0.2 to 5 millimeters (0.2 mm-5 mm).

In the preferred embodiment of the present invention, the fiber prepreg material 30 is attached to the upper die 20 by adhering (or sticking or bonding).

In the preferred embodiment of the present invention, the fiber prepreg material 30 is a sheet shaped fiber selected from carbon fiber or reinforced fiber. The fiber prepreg material 30 is stacked layer by layer to reach a predetermined thickness.

In the preferred embodiment of the present invention, the fiber prepreg material 30 is disposed at a unidirection (UD) state or a woven state.

In fabrication, the upper die 20 and the die module 10 are closed and then placed into a hot press to perform a heating and pressing process. Then, the gas 60 (such as a high pressure gas) with the predetermined pressure 70 is introduced through the passage 50 and poured into the upper die 20. At this time, the upper die 20 is made of plastic sheet material so that the upper die 20 will be softened under a high temperature, such as ranging between 110-180° C. In such a manner, the pressure 70 of the gas 60 is conducted to the fiber prepreg material 30 smoothly and evenly (as indicated by the arrows shown in FIG. 1) through the upper die 20 that is softened. Thus, the upper die 20 applies a pressure that is evenly distributed in all directions of the inner space of the molded product during the molding process, so that the molded product of the fiber prepreg material 30 has a better side wall structure.

Figure 2:
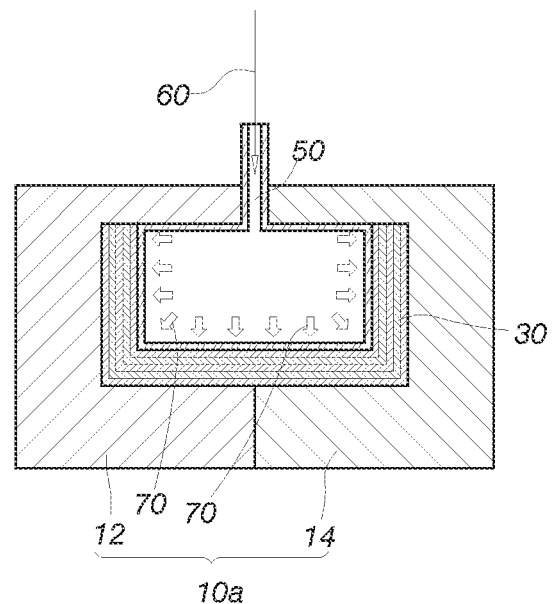
FIG. 2 is a cross-sectional view of a molded product in accordance with the second preferred embodiment of the present invention, wherein the die module has a left die and a right die.

Referring to FIG. 2, the die module 10a has a different shape so that the molded product has a different configuration.

Figure 3:
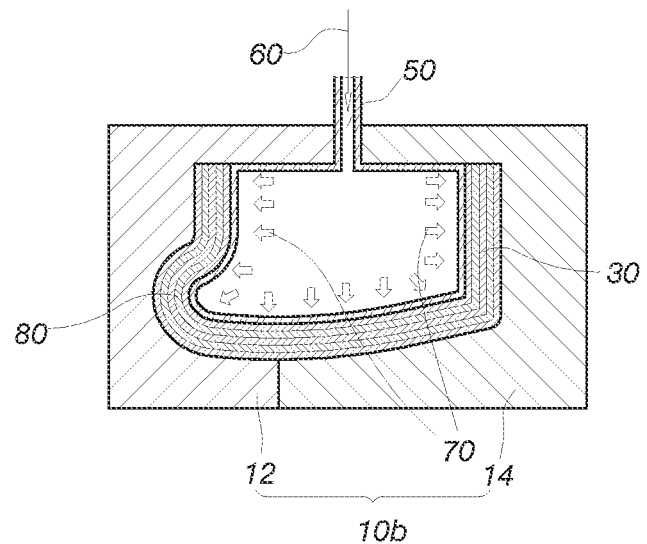
FIG. 3 is a cross-sectional view of a molded product in accordance with the third preferred embodiment of the present invention, wherein the die module has an undercut.

Referring to FIG. 3, the die module 10b has an undercut 80. In practice, the upper die 20 is flexible with a deformable elasticity so that the upper die 20 is easily placed into the die module 10b. The manufacturing procedures (such as the step in which the upper die 20 and the die module 10b are closed, and the heating and pressing step) are the same as that illustrated previously and will not be described in detail.

It is appreciated that, the upper die 20 is made of plastic sheet so that the upper die 20 is softened during the molding process and will transmit the pressure to the fiber prepreg material 30 evenly. Thus, the upper die 20 is used one time only and is different from the upper metal die as described in the traditional manufacturing method.

Accordingly, the hot-pressing molding method of the present invention introduces a pressure that is transmitted evenly to the fiber prepreg material 30 to apply a pressure on the lateral direction of the molded product so that the molded product has a better side wall structure. In addition, the molded product of the fiber prepreg material 30 has a reinforced or strengthened side wall structure so that the molded product may bear a side wall with a height ranging between 5 mm to 100 mm or higher. Further, the upper die 20 is flexible so that the molded product is formed with an undercut easily without being interfered by the die module.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A hot-pressing molding method for fiber thermosetting prepreg material, comprising:
    providing a die module including a first side die and a second side die;
    providing an upper die;
    attaching fiber prepreg material to the upper die with the fiber prepreg material facing the die module;
    closing the upper die and the die module with the upper die and the fiber prepreg material enclosed by and sandwiched between the first side die and the second side die of the die module;
    heating and pressurizing the upper die and the die module;
    introducing and pouring a gas with a predetermined pressure through a preset passage into the upper die to soften the upper die so that the softened upper die transmits the predetermined pressure of the gas to the fiber prepreg material; and
    forming a molded product of the fiber prepreg material; wherein:
    the preset passage protrudes from the first side die and the second side die of the die module when closing the upper die and the die module;
    the first side die and the second side die construct an outer face of the molded product;
    the first side die and the second side die are made of metallic material;
    the upper die constructs an inner face of the molded product;
    the upper die is made of plastic material; and
    the upper die has a hollow structure that is formed by blow molding.

2. The method as claimed in claim 1, wherein a temperature for heating the upper die and the die module ranges between 110° C.-180° C.

3. The method as claimed in claim 1, wherein the plastic material of the upper die includes PP, PET, HDPE or PVC.

4. The method as claimed in claim 1, wherein the upper die is a plastic hollow die with a shell shape.

5. The method as claimed in claim 4, wherein the upper die has a thickness ranging between 0.2 mm-5 mm.

6. The method as claimed in claim 1, wherein the die module has an undercut.

7. The method as claimed in claim 1, wherein the fiber prepreg material is attached to the upper die by adhering.

8. The method as claimed in claim 1, wherein:
the fiber prepreg material is a sheet shaped fiber selected from carbon fiber or reinforced fiber; and
the fiber prepreg material is stacked layer by layer to reach a predetermined thickness.

9. The method as claimed in claim 8, wherein the fiber prepreg material is disposed at a unidirection state or a woven state.

10. The method as claimed in claim 1, wherein the preset passage is provided on and extends upward from a top of the upper die.

11. The method as claimed in claim 1, wherein the fiber prepreg material is attached to the upper die before closing the upper die and the die module.

12. The method as claimed in claim 1, wherein the fiber prepreg material surrounds a periphery of the upper die.

13. The method as claimed in claim 1, wherein the first side die and the second side die of the die module surround a periphery of the fiber prepreg material.

14. The method as claimed in claim 1, wherein the inner face of the molded product surrounds the upper die, and the outer face of the molded product is surrounded by the first side die and the second side die of the die module.

15. The method as claimed in claim 1, wherein the upper die applies a lateral pressure to the inner face of the molded product.

16. The method as claimed in claim 1, wherein the predetermined pressure is evenly distributed through the upper die in all directions toward an inner space of the molded product during a molding process.

17. The method as claimed in claim 1, wherein the predetermined pressure is directed in a lateral direction toward the fiber prepreg material.

18. The method as claimed in claim 1, wherein the first side die and the second side die of the die module are directed in a lateral direction toward the upper die when closing the upper die and the die module.

\* \* \* \* \*